(12) United States Patent
Beierl et al.

(10) Patent No.: US 7,651,152 B2
(45) Date of Patent: Jan. 26, 2010

(54) TOP FOR A CONVERTIBLE

(75) Inventors: Dominik Beierl, Korntal-Münchingen (DE); Felix Hermann, Leonberg (DE); Lars Schulz, Schöneiche (DE); Reiner Armbruster, Mühlacker (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 304 days.

(21) Appl. No.: 11/852,485

(22) Filed: Sep. 10, 2007

(65) Prior Publication Data

US 2008/0061593 A1  Mar. 13, 2008

(30) Foreign Application Priority Data

Sep. 8, 2006  (DE) .................. 10 2006 042 258

(51) Int. Cl.
*B60J 7/00* (2006.01)
(52) U.S. Cl. .................. 296/107.07; 296/107.08
(58) Field of Classification Search ........... 296/107.07, 296/118, 122, 107.09, 107.12, 117, 107.01, 296/108, 107.18
See application file for complete search history.

(56) References Cited

U.S. PATENT DOCUMENTS

| 5,207,474 | A | | 5/1993 | Licher et al. | |
| 6,139,087 | A | * | 10/2000 | Wolfmaier et al. | 296/107.05 |
| 6,270,143 | B1 | * | 8/2001 | Heselhaus et al. | 296/107.07 |
| 6,464,284 | B2 | * | 10/2002 | Neubrand | 296/107.07 |
| 6,666,494 | B2 | * | 12/2003 | Antreich | 296/107.07 |
| 6,843,522 | B2 | * | 1/2005 | Lange | 296/107.09 |
| 7,118,161 | B2 | * | 10/2006 | Neubrand | 296/107.08 |
| 7,178,852 | B2 | | 2/2007 | Obendiek et al. | |
| 7,300,095 | B2 | * | 11/2007 | Rawlings et al. | 296/107.08 |
| 7,438,343 | B2 | * | 10/2008 | Heselhaus | 296/107.01 |
| 7,497,498 | B2 | * | 3/2009 | Theuerkauf | 296/107.09 |
| 7,500,709 | B2 | * | 3/2009 | Heselhaus | 296/107.07 |
| 2003/0057728 | A1 | * | 3/2003 | Sims | 296/107.08 |
| 2004/0061353 | A1 | * | 4/2004 | Habacker | 296/107.08 |
| 2007/0035154 | A1 | * | 2/2007 | Eisenreich et al. | 296/107.01 |
| 2007/0284909 | A1 | * | 12/2007 | Dilluvio | 296/107.01 |
| 2008/0061593 | A1 | * | 3/2008 | Beierl et al. | 296/107.07 |
| 2008/0277962 | A1 | * | 11/2008 | Beierl | 296/107.07 |

FOREIGN PATENT DOCUMENTS

| DE | 196 13 356 C2 | 10/1997 |
| DE | 103 51 062 B3 | 4/2005 |
| DE | 102 05 935 B4 | 7/2005 |
| EP | 0 521 307 B2 | 1/1993 |
| EP | 1 101 642 B1 | 5/2001 |

* cited by examiner

*Primary Examiner*—Kiran B. Patel

(57) ABSTRACT

A top for a convertible has a rear window frame, at least one roof section placed in front of it in the direction of travel when the top is closed, and a lateral top linkage. When the top is closed, a further roof section which is connected to the top linkage in an articulated manner and can be driven by the latter is provided between a front roof section and the rear window frame.

17 Claims, 3 Drawing Sheets

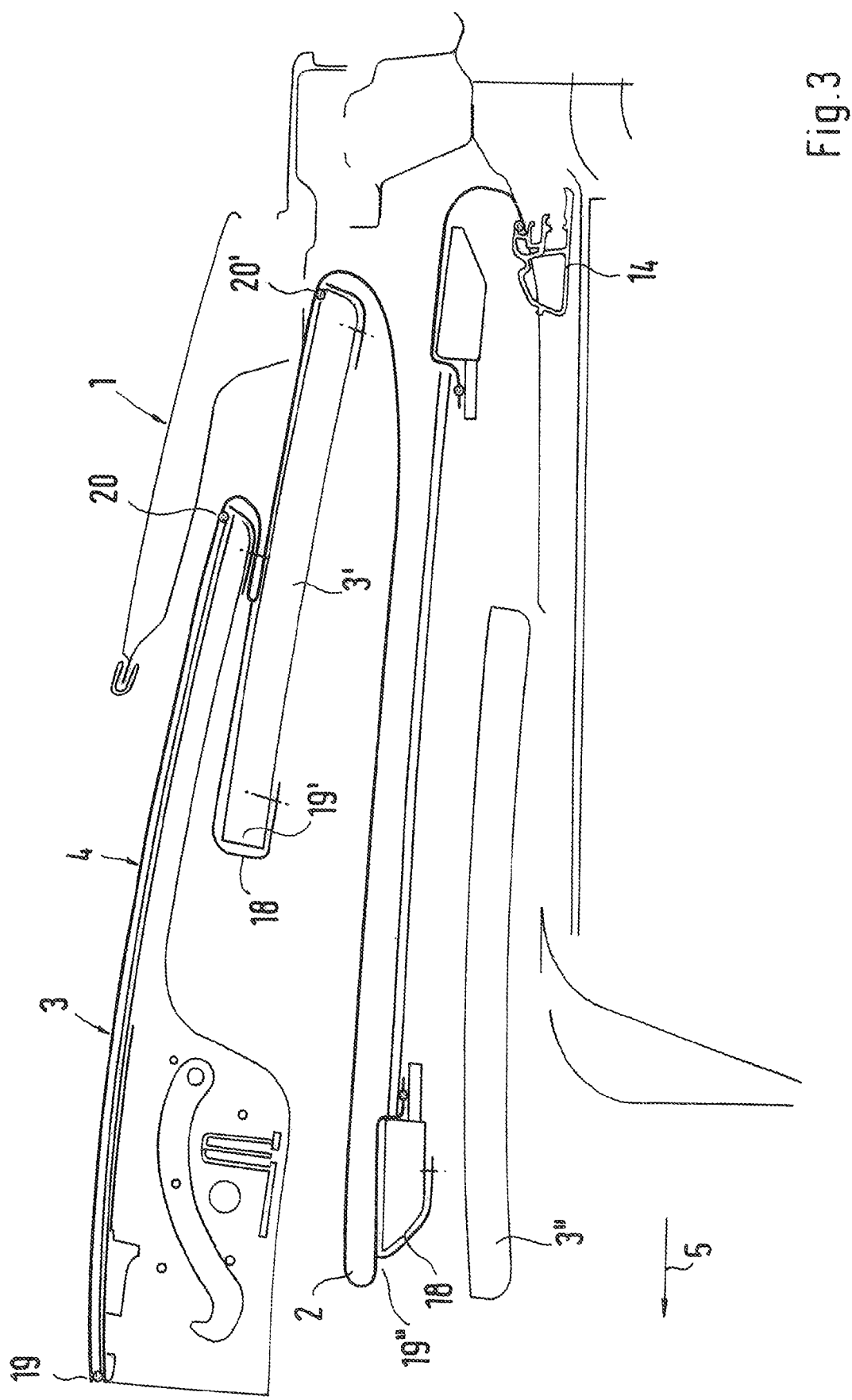

TOP FOR A CONVERTIBLE

CROSS-REFERENCE TO RELATED APPLICATION

This application claims the priority, under 35 U.S.C. § 119, of German application DE 10 2006 042 258.9, filed Sep. 8, 2006; the prior application is herewith incorporated by reference in its entirety.

BACKGROUND OF THE INVENTION

Field of the Invention

The present invention relates to a top for a convertible which has a rear window frame, at least one roof section placed in front of it in a direction of travel when the top is raised, and a lateral top linkage.

European patent EP 0 521 307 B2, corresponding to U.S. Pat. No. 5,207,474, discloses a folding top with an inherently stiff and dimensionally stable top shell which is located between front linkage limbs and forms a protective covering over the folded-back folding top. Therefore an additional tarpaulin or an additional covering does not have to be fitted over the folding top. The folding top has a rear window frame and at least one roof section placed in front of it in the direction of travel when the top is raised, such as a top linkage which runs laterally.

German patent DE 103 51 062 B3, corresponding to U.S. Pat. No. 7,178,852, discloses a top for a convertible, which has a roof module which contains at least one rigid roof part and is connected to the vehicle by a main link mechanism containing a main four-bar linkage. Within the course of a lowering movement of the top, the roof module can be moved into a rear storage region. In addition to the main four-bar linkage, the known top has a second four-bar linkage constructed on the main four-bar linkage, the second four-bar linkage being coupled to the main four-bar linkage in a positively controlled manner.

Further tops are known, for example, from European patent EP 1 101 642 B1 (corresponding to U.S. Pat. No. 5,270,143), German patent DE 196 13 356 C2 (corresponding to U.S. Pat. No. 6,139,087) and from German patent DE 102 05 935 B4.

SUMMARY OF THE INVENTION

It is accordingly an object of the invention to provide a top for a convertible which overcomes the above-mentioned disadvantages of the prior art devices of this general type, which permits a particularly space-saving storage position for the top.

With the foregoing and other objects in view there is provided, in accordance with the invention, a top for a convertible. The top contains a rear window frame, roof sections disposed in front of the rear window frame in a direction of travel when the top is closed, and a lateral top linkage. The roof sections include a front roof section and a further roof section disposed between the front roof section and the rear window frame, when the top is closed. The further roof section is connected to the lateral top linkage in an articulated manner and is driven by the lateral top linkage.

The invention is based on the general concept, in the case of a top with a rear window frame and at least two roof sections which are placed in front of the rear window frame in the direction of travel when the top is raised, of coupling the roof section placed directly in front of the rear window frame to a top linkage in an articulated manner, specifically in such a manner that the roof section is driven by the top linkage during an lowering and raising movement. In contrast to conventional tops, in which, for example, only the frontmost roof section as seen in the direction of travel is coupled in terms of drive to the top linkage, in the case of the top according to the invention all of the roof sections are connected at least indirectly to the top linkage and, as a result, are driven by it. The top linkage is configured in the manner of a driving linkage and passes on lowering and raising forces acting on the top linkage to the individual roof sections. Furthermore, by use of a sophisticated coupling of the top linkage to the individual roof sections, a particularly space-saving storage position of the top according to the invention can be obtained, and therefore, when the top is down, it can be put away in a construction-space-minimizing manner in a rear region of the convertible. Furthermore, the particularly compact storage position results from the fact that, in comparison to conventional tops known from the prior art, three roof sections are now provided which each have significantly shorter dimensions in the longitudinal direction of the vehicle than is the case for a top merely formed of two roof sections.

In an advantageous development of the solution according to the invention, the top linkage is configured in such a manner that, when the top is put lowered, the second surface bow, i.e. the roof section placed directly in front of the rear window frame in the direction of travel when the top is raised, is put away under the rear window frame, and the integral roof frame and the first surface bow, i.e. the frontmost roof sections as seen in the direction of travel, are put away above the rear window frame. In this embodiment, the top according to the invention contains three roof sections and the rear window frame, the second surface bow being displaced under the rear window frame, and the integral roof frame or the first surface bow being displaced over the rear window frame during an lowering movement of the top, as a result of which a particularly compact storage position can be achieved when the top is put down.

In a further advantageous embodiment, the top has a flexible covering which at least partially covers the latter and, in order to achieve a predefined folding of the top during lowering, is connected to the first surface bow via an elastic pull band. During the lowering movement of the top, the covering lifts off from those roof sections to which it is not connected. The covering is not connected at any point, for example, to the second surface bow, thus enabling the second surface bow to be displaced under the rear window frame during the lowering movement of the top. During the lowering of the top, the above-mentioned elastic pull band brings about an elastic fixing of the covering to the corresponding roof section, as a result of which a predefined folding movement of the covering is enforced and the latter is therefore folded in the same manner during every lowering movement. By this measure, an generally consistently identical lowering and raising movement and an generally consistently identical storage position of the top according to the invention can be enforced, thus making it possible to lower and raise and put away the top in a particularly precise manner.

Further important features and advantages of the invention emerge from the subclaims, from the drawings and from the associated description of the figures with reference to the drawings.

Other features which are considered as characteristic for the invention are set forth in the appended claims.

Although the invention is illustrated and described herein as embodied in a top for a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a diagrammatic, sectional view of the top in the fully lowered state.

DETAILED DESCRIPTION OF THE INVENTION

Figure 1:
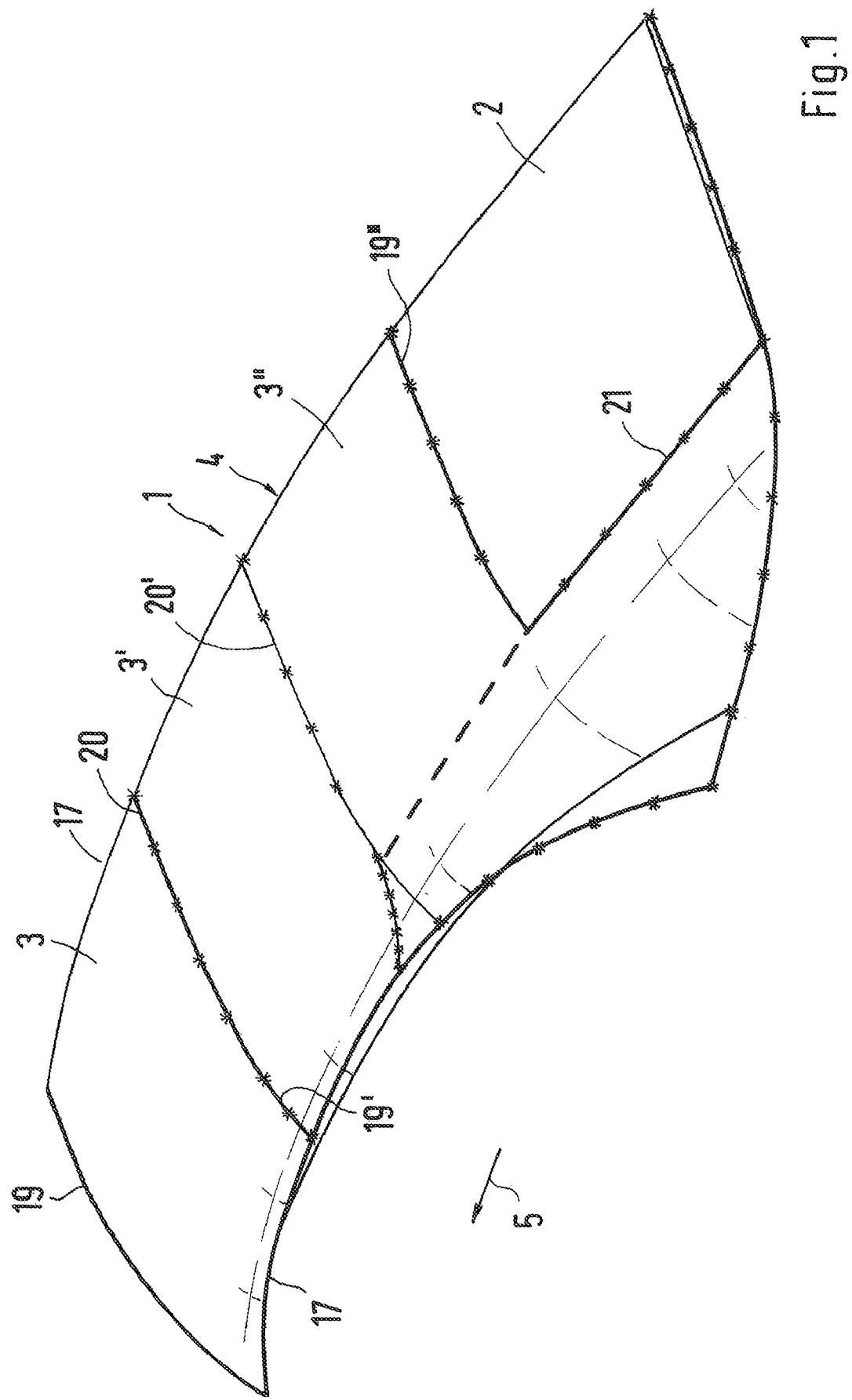
FIG. 1 is a diagrammatic, perspective view of a top according to the invention for a convertible in a raised state.

Referring now to the figures of the drawing in detail and first, particularly, to FIG. 1 thereof, there is shown a top 1 according to the invention of a convertible (otherwise not illustrated). The top 1 has a rear window frame 2 and three roof sections 3, 3', 3" placed in front of it in the direction of travel 5 when the top 1 is closed. When the top 1 is closed (fully raised), the individual roof sections 3, 3', 3" and the rear window frame 2 form a continuous roof contour and are usually covered by a covering 4, preferably a water-repelling covering 4. Of course, the covering 4 only covers the rear window frame 2 in a region surrounding a non-illustrated rear window. A longitudinal extent of the individual roof sections 3, 3', 3" and of the rear window frame 2 in a longitudinal direction 5 of the vehicle can be seen in FIGS. 2 and 3. The longitudinal direction 5 of the vehicle is usually also the direction of travel 5 of the convertible. Furthermore, the frontmost roof section 3 in the direction of travel 5 is also referred to as the integral roof frame 3, the roof frame 3' situated directly behind it is referred to as the first surface bow 3', and the roof section 3" situated directly behind the roof section 3' is referred to as the second surface bow 3". The integral roof frame 3 and the two surface bows 3, 3" have the task, in particular, of clamping the covering 4 when the top 1 is raised and, as a result, of forming a uniform roof contour.

Figure 2:
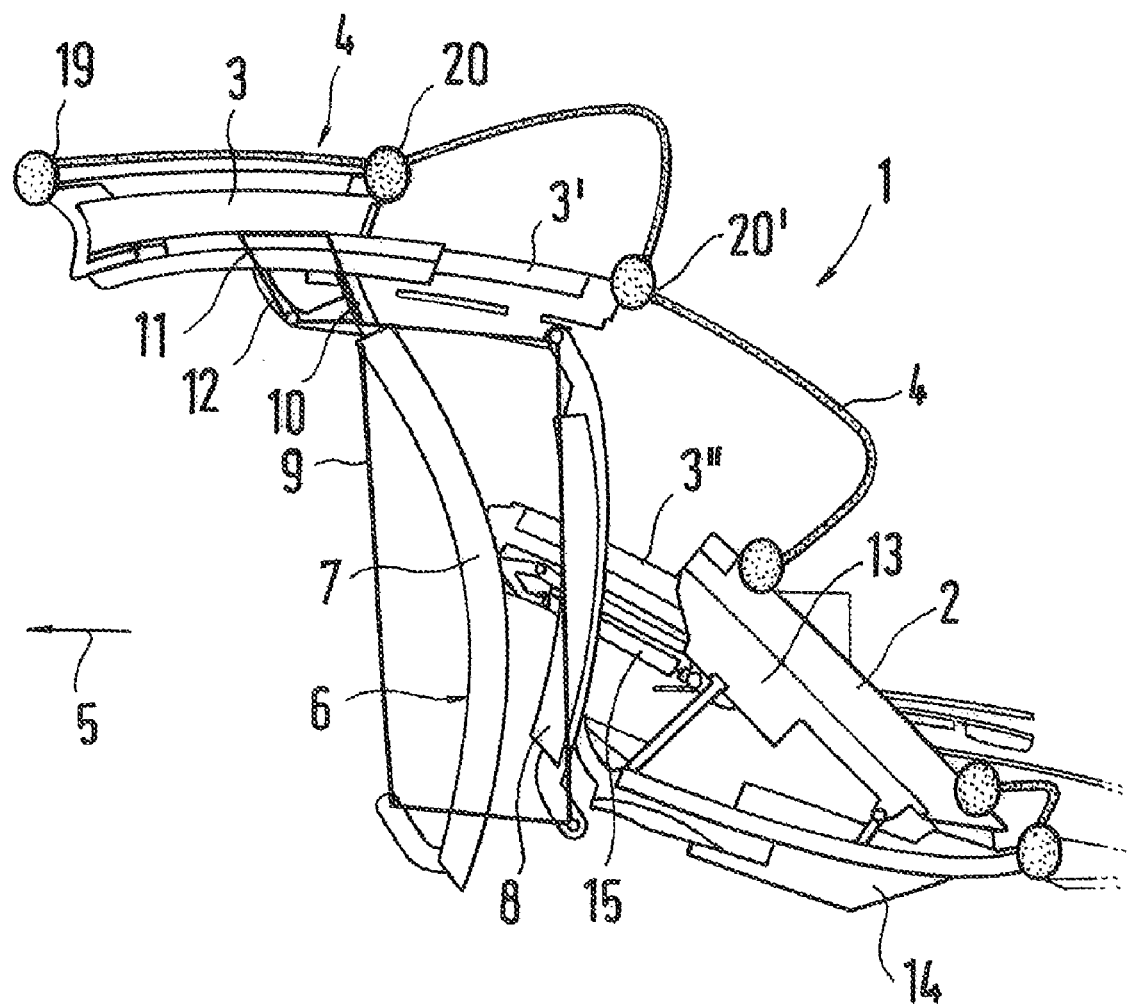
FIG. 2 is a diagrammatic, sectional view through the top in a partially lowered (open) state.

As can be seen in FIG. 2, the top 1 has a lateral top linkage 6 which is configured at the same time as a driving linkage and, during an lowering (opening) and raising (closing) operation of the top 1, brings about the relative displacement of the individual roof sections 3, 3', 3" and of the rear window frame 2. For this purpose, the top linkage 6 on each side of the vehicle has a roof link 7 and a main link 8 placed behind it in the direction of travel 5. Usually, only the roof link 7 is driven. The roof link 7 and the main link 8 together form a first four-bar linkage 9, also called the main four-bar linkage, with both the roof link 7 and the main link 8 each being mounted in an articulated manner at one end on a non-illustrated bracket fixed on the vehicle and at the other end on the roof section 3', i.e. the first surface bow 3', disposed directly behind the frontmost roof section 3, i.e. the integral roof frame 3. An extension 10 of the roof link 7 forms a link of a second four-bar linkage 11, a further link 12 of which is mounted in an articulated manner firstly on the integral roof frame 3 and secondly on the first surface bow 3'.

In addition, the roof section 3", i.e. the second surface bow 3", is mounted in an articulated manner on the roof link 7, the second surface bow 3" being positively guided at the other end in a guide 13 on the rear window frame 2. During a displacement movement of the top 1, the roof link 7 therefore not only drives the main link 8 and the first surface bow 3' via the first four-bar linkage 9, and the integral roof frame 3 via the second four-bar linkage 11, but also brings about a displacement movement of the second surface bow 3". The second surface bow 3" is therefore also driven by the roof link 7.

By contrast, the main link 8 is connected in an articulated manner directly or indirectly to a clamping bow 14 and the rear window frame 2. The clamping bow 14 forms a rear end of the top 1. In general, the top linkage 6 is configured in such a manner that when the top 1 is lowered, i.e. put away (see FIG. 3), the second surface bow 3" is put away below the rear window frame 2 while the first surface bow 3' and the integral roof frame 3 are put away above the rear window frame 2. This permits a particularly compact storage position of the top 1 in the lowered state, thus enabling a particularly esthetic overall impression to be obtained.

It can likewise be seen in FIG. 2 that a displacement device 15 is provided on the second surface bow 3", which displacement device, at the beginning of an lowering movement of the closed top 1, brings about a downward movement of the second surface bow 3' out of the roof contour and, as a result, only permits the lowering of the top 1.

As mentioned at the beginning, the top 1 has a flexible covering 4 which at least partially covers it and is connected to the individual roof sections 3, 3', 3", and to the rear window frame 2 and the clamping bow 14 in the following manner. Along a front edge 19 of the frontmost roof section 3, i.e. the integral roof frame 3, which front edge runs in the transverse direction of the vehicle, the covering 4 is connected linearly to the integral roof frame 3, which is illustrated according to FIG. 1 by a corresponding solid line and, according to FIG. 2, by a circle with a border. The covering 4 is also connected to the frontmost roof section 3 along a rear edge 20 of the same that runs in the transverse direction of the vehicle. However, the connection between the covering 4 and the rear edge 20 of the frontmost roof section 3 takes place via a pull strip 16 (see FIG. 3), as a result of which a tensioning of the covering 4 in the region of the integral roof frame 3 can be produced. A pull strip 16 of this type can extend over the entire width of the integral roof frame 3. Furthermore, the covering 4 is connected linearly to the integral roof frame 3 along two lateral edges 17 of the same.

With regard to the first surface bow 3', it is to be noted that the covering 4 is connected linearly to the first surface bow 3' along a rear edge 20' of the same that runs in the transverse direction of the vehicle, to be precise is likewise connected thereto via a "pull strip" 16. In the region of the front edge 19' of the first surface bow 3', the covering 4 is connected via an elastic pull band 18 (see FIG. 3) to the first surface bow 3' which enforces a predefined folding of the covering 4 during opening of the top 1.

In the region of the rear window frame 2, the covering 4 is fixedly connected to the rear window frame 2 in the transverse direction of the vehicle, at a rear and at a front edge region of the rear window frame 2, more precisely in the region between the rear window and the rear window frame 2. Furthermore, the covering 4 is also connected to the rear window frame 2 linearly along the line 21 in the longitudinal direction of the vehicle adjacent to the rear window (see FIG. 1). The covering 4 is likewise connected linearly to the clamping bow 14 along the latter in the transverse direction of the vehicle. An elastic pull band 18 is likewise provided on a front edge 19" of the rear window frame 2, the pull band bringing about an elastic connection between the covering 4 and the front edge 19" of the rear window frame 2 and likewise enforcing a predefined folding of the covering 4, as illustrated in FIG. 3, during the opening of the top 1. It remains to emphasize that the covering 4 is not connected at any point to the second surface bow 3", and therefore the latter, during the opening of the top 1, can be detached from the covering 4 and displaced under the rear window frame 2.

By the configuration and connection of the individual roof sections 3, 3' and of the rear window frame 2 to the covering 4, it is possible, as mentioned at the beginning, to obtain a continuous roof contour when the top 1 is raised, with the connection of the covering 4 to the individual roof sections 3, 3' and the rear window frame 2, in particular the connection via the pull strip 16 or the pull bands 18, enforcing a consistently identical, predefined folding of the top 1 during the lowering of the top 1.

The invention claimed is:

1. A top for a convertible, the top comprising:
a rear window frame;
roof sections disposed in front of said rear window frame in a direction of travel when the top is closed; and
a lateral top linkage;
said roof sections include three roof sections having a frontmost roof section in said direction of travel being an integral roof frame and remaining ones of said roof sections disposed behind said frontmost roof section being first and second surface bows when the top is closed, said second surface bow being connected to said lateral top linkage in an articulated manner and is driven by said lateral top linkage.

2. The convertible according to claim 1, wherein said lateral top linkage is configured such that, when the top is put away, said second surface bow is put away below said rear window frame, and said first surface bow and said integral roof frame are put away above said rear window frame.

3. The convertible according to claim 1, wherein said lateral top linkage is disposed on each side of the convertible and has a roof link and a main link placed behind said roof link in said direction of travel, said roof link and said main link together form a first four-bar linkage, said roof link and said main link each being mounted in an articulated manner at a first end on a bracket fixed on the convertible and at a second end on said first surface bow directly behind said frontmost roof section.

4. The convertible according to claim 3, wherein said roof section disposed directly in front of said rear window frame in the direction of travel when the top is closed is connected in an articulated manner to said roof link of said lateral top linkage and can be driven by said lateral top linkage; and
further comprising a clamping bow, said main link is connected directly or indirectly in an articulated manner to said clamping bow and to said rear window frame.

5. The convertible according to claim 3, wherein said roof link has an extension forming a link of a second four-bar linkage, said second four-bar linkage having a further link mounted in an articulated manner first on said front most roof section and second on said roof section disposed directly behind it.

6. The convertible according to claim 1, further comprising a flexible covering at least partially covering the top.

7. The convertible according to claim 6, wherein said frontmost roof section has a front edge running in a transverse direction of the convertible, said flexible covering is connected linearly to said frontmost roof section along said front edge;
further comprising a pull strip;
wherein said frontmost roof section has a rear edge running in a transverse direction of the convertible, said flexible covering is connected via said pull strip to said frontmost roof section along said rear edge; and
wherein said frontmost roof section has two lateral edges and said flexible covering is connected linearly to said frontmost roof section along said two lateral edges.

8. The convertible according to claim 6, wherein said first surface bow has a rear edge running in a transverse direction of the convertible; and
further comprising a pull strip, said flexible covering is connected via said pull strip linearly to said first surface bow along said rear edge.

9. The convertible according to claim 6, further comprising a clamping bow;
wherein said rear window frame has a rear edge region; and
wherein said flexible covering is connected linearly at said rear edge region of said rear window frame and along said clamping bow to said rear window frame and said clamping bow in a transverse direction of the convertible.

10. The convertible according to claim 6, further comprising an elastic pull band;
wherein to achieve a predefined folding of said covering during opening, said covering is connected to said first surface bow via said elastic pull band; and
wherein to achieve a predefined folding of said covering during opening, said covering is connected to said rear window frame via said elastic pull band.

11. The convertible according to claim 3, wherein said roof section disposed directly in front of said rear window frame in the direction of travel when the top is closed is connected in an articulated manner to said roof link of said lateral top linkage and can be driven by said lateral top linkage.

12. The convertible according to claim 3, further comprising a clamping bow, said main link is connected directly or indirectly in an articulated manner to said clamping bow and to said rear window frame.

13. The convertible according to claim 6, wherein said frontmost roof section has a front edge running in a transverse direction of the convertible, said flexible covering is connected linearly to said frontmost roof section along said front edge.

14. The convertible according to claim 6, further comprising a pull strip, said frontmost roof section has a rear edge running in a transverse direction of the convertible, said flexible covering is connected via said pull strip to said frontmost roof section along said rear edge.

15. The convertible according to claim 6, wherein said frontmost roof section has two lateral edges and said flexible covering is connected linearly to said frontmost roof section along said two lateral edges.

16. The convertible according to claim 6, further comprising an elastic pull band, wherein to achieve a predefined folding of said covering during lowering, said covering is connected to said first surface bow via said elastic pull band.

17. The convertible according to claim 6, further comprising an elastic pull band, wherein to achieve a predefined folding of said covering during lowering, said covering is connected to said rear window frame via said elastic pull band.

* * * * *